Dec. 27, 1938.   W. J. SPARLING   2,141,771
SPROCKET CHAIN CONSTRUCTION
Filed Aug. 21, 1936
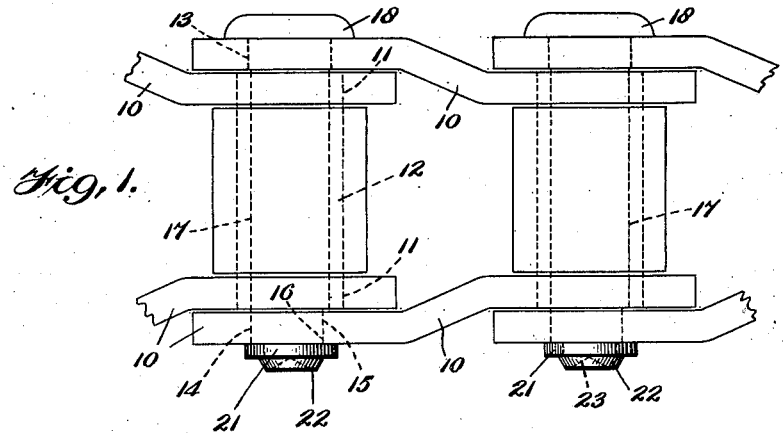
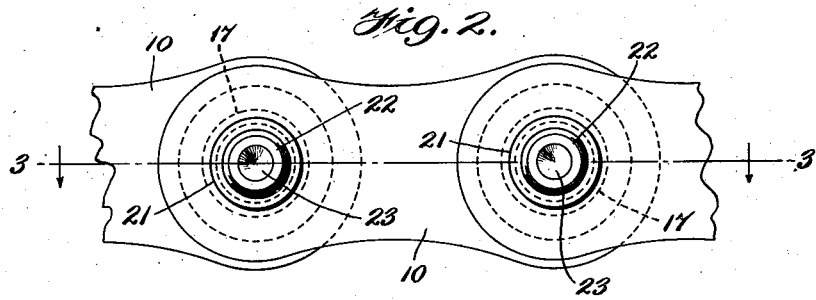
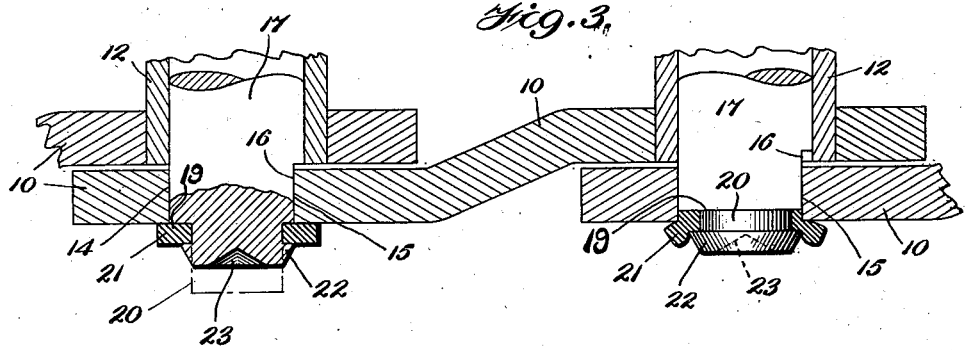
Inventor
William J. Sparling, Patented Dec. 27, 1938

2,141,771

UNITED STATES PATENT OFFICE 2,141,771

SPROCKET CHAIN CONSTRUCTION

William J. Sparling, Milwaukee, Wis., assignor to Chain Belt Company, Milwaukee, Wis., a corporation of Wisconsin Application August 21, 1936, Serial No. 97,280

3 Claims. (Cl. 74—254)

The invention relates to sprocket chain construction, and has for one of its objects to provide an improved means for positively retaining the pintles of such chains in operative position, while at the same time permitting them to be easily and quickly removed without damage to the link apertures in case repairs or replacements become necessary.

In certain classes of work, as for example in oil well drilling, power transmitting sprocket chains are now commonly operated at high speeds and under conditions not met with in ordinary chain drive practice. These speeds and conditions call for an exceptionally sturdy chain in which every precaution is taken against failure of any of the elements entering into the chain construction. One of the most common failures in these high speed chains has been in the means employed for retaining the chain pintles in place. Split cotter pins, such as have long been used in slower speed chains have an exceedingly short life, since they pass loosely through the holes in the pintle ends, and the excessive vibration quickly wears them to the point of breakage. When this occurs, not only do the cotters fly out, with danger to workmen at considerable distances from the apparatus, but the pintles themselves work out and the chain flies apart, frequently inflicting serious injury upon workmen nearby.

Riveted chain, i. e., chain in which both ends of the pintle are headed, of course obviates much of this difficulty; but as heretofore constructed, such chain has not found extensive use in the oil fields because of the difficulty of dismantling it in the field for repairs or replacements.

The chains are usually of the roller type, with links composed of steel side bars connected at one end by hardened and ground sleeves or bushings which are press-fitted into apertures in the side bars. The pintles, which are also hardened for wear resistance, are journaled in the bushings and project through apertures formed in the ends of the side bars of the next adjacent link, ordinarily being suitably keyed in such apertures to prevent rotation. One end of the pintle is provided with a pre-formed head, and when of the riveted type, the other end, of the same diameter as the journal portion, projects beyond the side bar face a distance sufficient to permit of its being peened over during assembly to provide a riveted head which will prevent the pintle from working out.

While as above stated such construction is satisfactory from an operating standpoint, it does not lend itself to the easy removal of the pintles in the field for repairs or replacements. If a punch or drift be applied to the peened head and hammered to drive out the pintle, the head of the latter, being of greater diameter than the side bar aperture, will cut and mar the softer steel walls of the aperture, thus rendering the side bar unfit for further service. It will also frequently score the bearing surface of the bushing bore; and as a result riveted chain has not found a wide use, notwithstanding its recognized operating advantages under the rigorous conditions found in high speed fields.

It is a primary object of the present invention to provide a construction which will satisfactorily eliminate the above mentioned disadvantages, and in which the pintles will not only be securely retained against unintentional displacement, but may also be easily and quickly removed in the field without damage to the side bars.

With the above and other objects the invention consists in the novel details of construction and combinations of parts more fully hereinafter disclosed and particularly pointed out in the appended claims.

Referring to the accompanying drawing forming part of this specification, in which like reference characters designate like parts in all the views:—

Figure 1 is a diagrammatic plan view of a portion of a high speed chain constructed as above outlined and provided with the pintle retaining means in accordance with the present invention;

Fig. 2 is a side elevational view of the parts shown in Fig. 1; and

Fig. 3 is an enlarged fragmentary horizontal sectional view taken approximately on the plane indicated by the line 3—3 of Fig. 2.

As above indicated, the links of the chain are made up of spaced side bars 10 of relatively soft steel, which are provided at one end with apertures 11 for the reception of the ends of the hardened bushing or sleeve 12, which ends are press-fitted into the apertures 11 thus producing a substantially rigid U-shaped link. The other ends of the side bars 10 are apertured as at 13 and 14, with the latter aperture being preferably provided with a flat 15 which is adapted to be engaged by a companion flat 16 on the pintle 17 to prevent relative rotation between the pintle and this end of the side bars.

In assembly the apertures 13 and 14 are aligned with the bore of the bushing 12 of the adjacent link and the pintle 17 is introduced through the aligned openings, as will be readily understood. The pintle is provided at one end with a pre-formed head 16 which engages the adjacent side bar to limit longitudinal movement of the pintle in one direction, and the other end of the pintle which projects beyond the opposite side bar is according to this invention provided with an extension 20 of materially smaller external diameter than that of the body portion of the pintle thereby forming a shoulder 19 which in assembled position is substantially flush with the outer face of the link side bar 10. During assembly after the pintle has been inserted through the aligned apertures and bushing, a washer 21 of comparatively soft steel or other similar material is positioned upon the reduced extension 20, after which that portion of the said extension which projects beyond the washer is subjected to a suitable swaging or peening action to form thereon a head 22, which head, while being of a diameter sufficient to retain the washer 21 in place, is at the same time of a diameter which is not greater than that of the apertures 13 and 14, as clearly indicated in Fig. 3. The head 22 intimately engages the outer face of the washer 21 to rigidly clamp the latter against the shoulder 19 and the outer face of the side bar 10, thereby insuring against vibration of the parts even at high speeds and wear and deterioration resulting therefrom.

It will be obvious from what has just been said, taken in connection with the drawing, that such a construction will provide a peened or riveted head upon the pintle end which in conjunction with the relatively soft metal washer 21 will serve to positively retain the pintle against unintentional displacement under normal operating conditions such as are met with even in the high speed field. On the other hand, if it becomes necessary to remove the pintles for repairs or replacements, if a punch or drift be inserted into the recess 23 which is formed in the outer face of the head 22, and force be applied as by hammering upon the tool to drive the pintle longitudinally, the head 22 being of harder material than the washer 21 will shear through the latter as is indicated at the right of Fig. 3, and being of a diameter not greater than that of the apertures 13 and 14 the head will pass through the said apertures and through the bore of the bushing 12 without injury to the walls of the apertures or bearing surface of the said bushing. Thus damage will be avoided to these parts which would render them unfit for further use and require replacement thereof.

While one form of the invention has been illustrated and described it is obvious that those skilled in the art may vary the details of construction as well as the precise arrangement of parts without departing from the spirit of the invention, and therefore it is not wished to be limited to the above disclosure except as may be required by the claims.

What is claimed is:—

1. In pintle securing means for high speed sprocket chains and the like, a member having a pintle-receiving aperture; a pintle of a material harder than said member extending through said aperture, said pintle having a reduced shank extending beyond the face of said member providing a perimetral shoulder in substantial alinement with said face; an annular washer of shearable material carried by said shank; and a head formed on the end of said shank beyond said washer arranged to rigidly secure the washer between it and said shoulder, said head being of a diameter not greater than that of said aperture, whereby upon application of force longitudinally of the pintle said head will cut through said shearable washer and pass through the aperture without damage to the same.

2. In pintle securing means for high speed sprocket chains and the like, a member having a pintle-receiving aperture therethrough; a pintle of a metal harder than said member extending through said aperture and projecting beyond the face of the member, said projecting portion being of a diameter which is less than that of the aperture, thereby providing a circumferential shoulder; a rigid annular washer of a material having a hardness which is not greater than that of said member, positioned on the reduced projecting portion of the pintle; and a head formed on the end of the reduced projecting portion of the pintle, intimately engaging said washer to rigidly clamp it against said shoulder, said head having a diameter which is less than that of the member aperture, whereby upon application of force longitudinally of the pintle, said head may cut through the washer and pass through said aperture without damage to the same.

3. In pintle securing means for high speed sprocket chains and the like, a member having a pintle-receiving aperture therethrough; a pintle of a metal harder than said member positioned in said aperture with a portion projecting beyond the face of said member, said projecting portion being of a reduced diameter thereby providing a circumferential shoulder substantially flush with said face; an annular washer of a material having a hardness which is not greater than that of said member, positioned on the reduced portion of said pintle; and a head swaged on the end of the reduced pintle portion subsequent to the placing of the washer thereon, and rigidly clamping the washer against said shoulder and face, said head having a diameter less than that of the aperture, and having a recess formed in its outer face for the reception of a tool by means of which force may be applied to the pintle to cause its head to shear through said washer and pass through the member aperture without damage thereto.

WILLIAM J. SPARLING.